(12) United States Patent
Baeuerle

(10) Patent No.: US 7,527,316 B2
(45) Date of Patent: May 5, 2009

(54) VEHICLE WITH REVERSIBLE CARGO SPACE MAT ARRANGEMENT

(75) Inventor: Hans-Peter Baeuerle, Weissach (DE)

(73) Assignee: Dr. Ing. h.c. F. Porsche AG, Weissach (DE)

( * ) Notice: Subject to any disclaimer, the term of this patent is extended or adjusted under 35 U.S.C. 154(b) by 72 days.

(21) Appl. No.: 11/729,933

(22) Filed: Mar. 30, 2007

(65) Prior Publication Data
US 2007/0236041 A1 Oct. 11, 2007

(30) Foreign Application Priority Data
Apr. 1, 2006 (DE) .................. 10 2006 015 185

(51) Int. Cl.
B60R 13/01 (2006.01)
(52) U.S. Cl. .............. 296/97.23; 296/39.1; 410/104
(58) Field of Classification Search .......... 296/97.23, 296/37.16, 37.14, 37.8, 39.1; 410/101, 104, 410/115
See application file for complete search history.

(56) References Cited

U.S. PATENT DOCUMENTS

| 7,097,401 B2 * | 8/2006 | Haspel ............ 410/101 |
| 2004/0197521 A1 | 10/2004 | Morriston |
| 2007/0041804 A1 | 2/2007 | Stoeckl et al. |

FOREIGN PATENT DOCUMENTS

| DE | 1 895 469 | 6/1964 |
| DE | 199 48 647 A1 | 5/2000 |
| DE | 100 40 803 A1 | 3/2002 |
| DE | 10 2004 047 152 A1 | 11/2005 |
| WO | WO 01/89878 A2 | 11/2001 |
| WO | WO 2005/065993 A1 | 7/2005 |

OTHER PUBLICATIONS

European Search Report dated Jun. 20, 2007 w/English translation of pertinent portion (four (4) pages).

* cited by examiner

Primary Examiner—H Gutman
Assistant Examiner—Melissa A Black

(57) ABSTRACT

In a vehicle having a cargo space, a reversible mat is situated at the same level as the retaining rails and/or their cover on the cargo space floor and between the retaining rails of a transport securing system projecting from the cargo space.

2 Claims, 3 Drawing Sheets

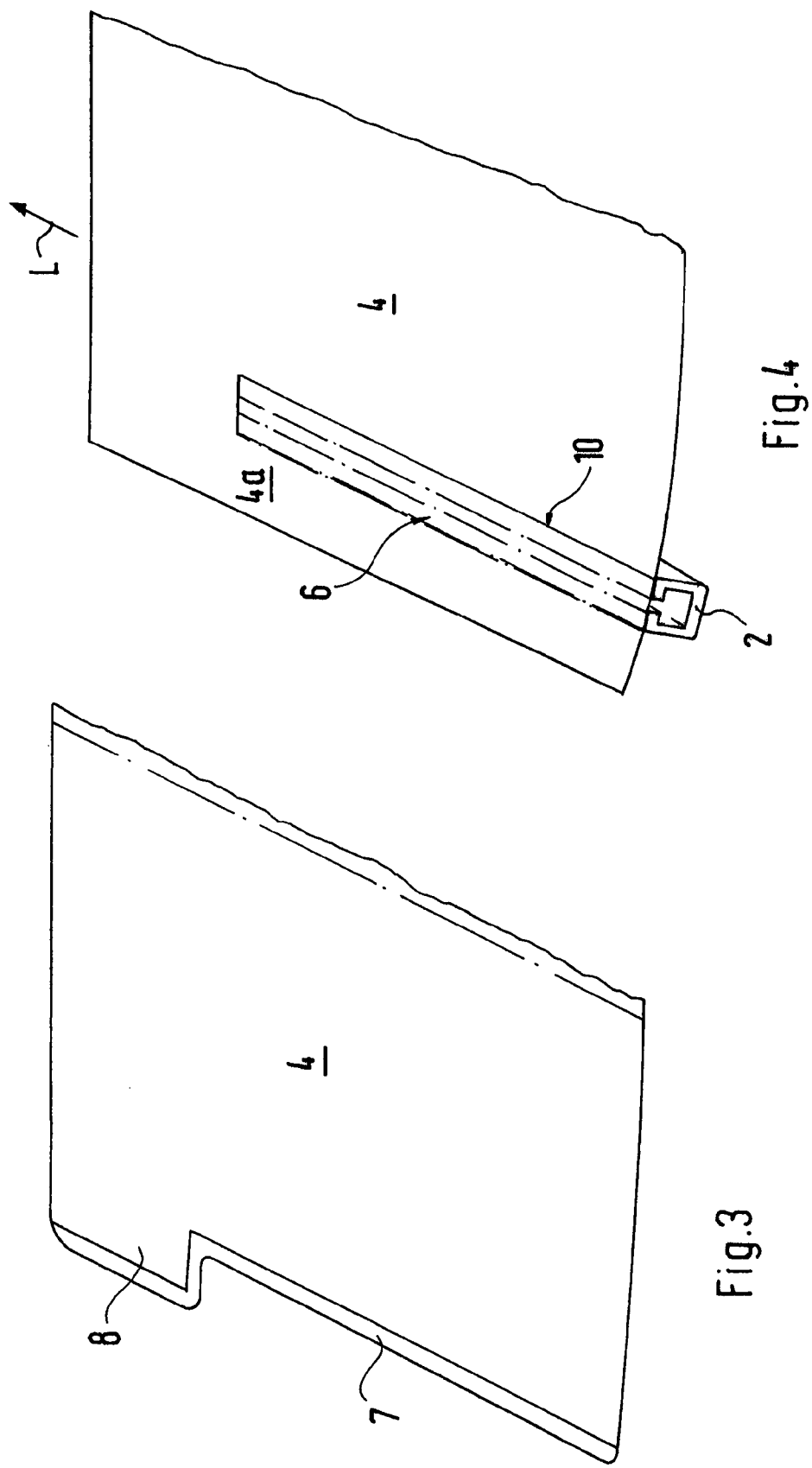

VEHICLE WITH REVERSIBLE CARGO SPACE MAT ARRANGEMENT

CROSS REFERENCE TO RELATED APPLICATIONS

This application claims the benefit of priority under 35 U.S.C. § 119 to German Patent Application No. 10 2006 015 185 filed Apr. 1, 2006, the disclosure of which is incorporated herein by reference in its entirety.

BACKGROUND AND SUMMARY OF THE INVENTION

The present invention relates to a vehicle having a cargo space in which a transport securing system is situated.

A cover plate, which is supported on contact surfaces of the vehicle structure and, using lateral profile elements, provides a flat cargo surface that is covered by a carpet, is disclosed in DE 199 48 647 A1 for covering a cargo space and/or storage space in a motor vehicle.

An object of the present invention is to implement a cargo space provided with retaining rails as flat.

This object has been achieved according to the present invention by providing a reversible mat situated between and in a space lying sunken in relation to transport securing system retaining rails projecting from a floor of the cargo space.

Among the primary advantages achieved by the present invention are that in spite of upwardly projecting retaining rails of a transport securing system, a flat cargo surface may be produced. This is obtained by inserting a reversible mat between the retaining rails that project from the cargo space floor so that a flat and level cargo space surface may be formed.

The projecting configuration of the retaining rails in the cargo space is constructionally required because these retaining rails can not be placed lower due to the predefined installation space in the vehicle structure.

To fill up the level of the sunken space between the retaining rails, the reversible mat has an appropriate thickness that fills up the space formed on top by the projecting retaining rails enough that the external surface of the mat extends up to the level of the retaining rails and/or their covers.

The reversible mat is implemented such that it has a carpet appearance on one side and is implemented on a rear side as an anti-slip mat having a dirt-repellent surface. Furthermore, the reversible mat has an external profiled border that directly adjoins the covers and/or the retaining rails.

The reversible mat extends over the entire length of the cargo space floor, a front face of the reversible mat being implemented with a flap-shaped part that additionally extends over the width of the retaining rails. Due to this implementation, the entire cargo space area is covered by the reversible mat, in particular between the retaining rails and the front faces of the retaining rails.

In a further embodiment, the reversible mat may also extend between the side walls or their inner panels, and has a slotted cutout for the passage of the retaining rails for this purpose. A part of the reversible mat then extends between the side wall and the retaining rail and/or the cover.

Other objects, advantages and novel features of the present invention will become apparent from the following detailed description of the invention when considered in conjunction with the accompanying drawings.

BRIEF DESCRIPTION OF THE DRAWINGS

FIG. 3 is a perspective view showing a part of the reversible mat, and FIG. 4 is a perspective view showing a further embodiment of the reversible mat with an enclosed retaining rail.

DETAILED DESCRIPTION OF THE DRAWINGS

Figure 1:
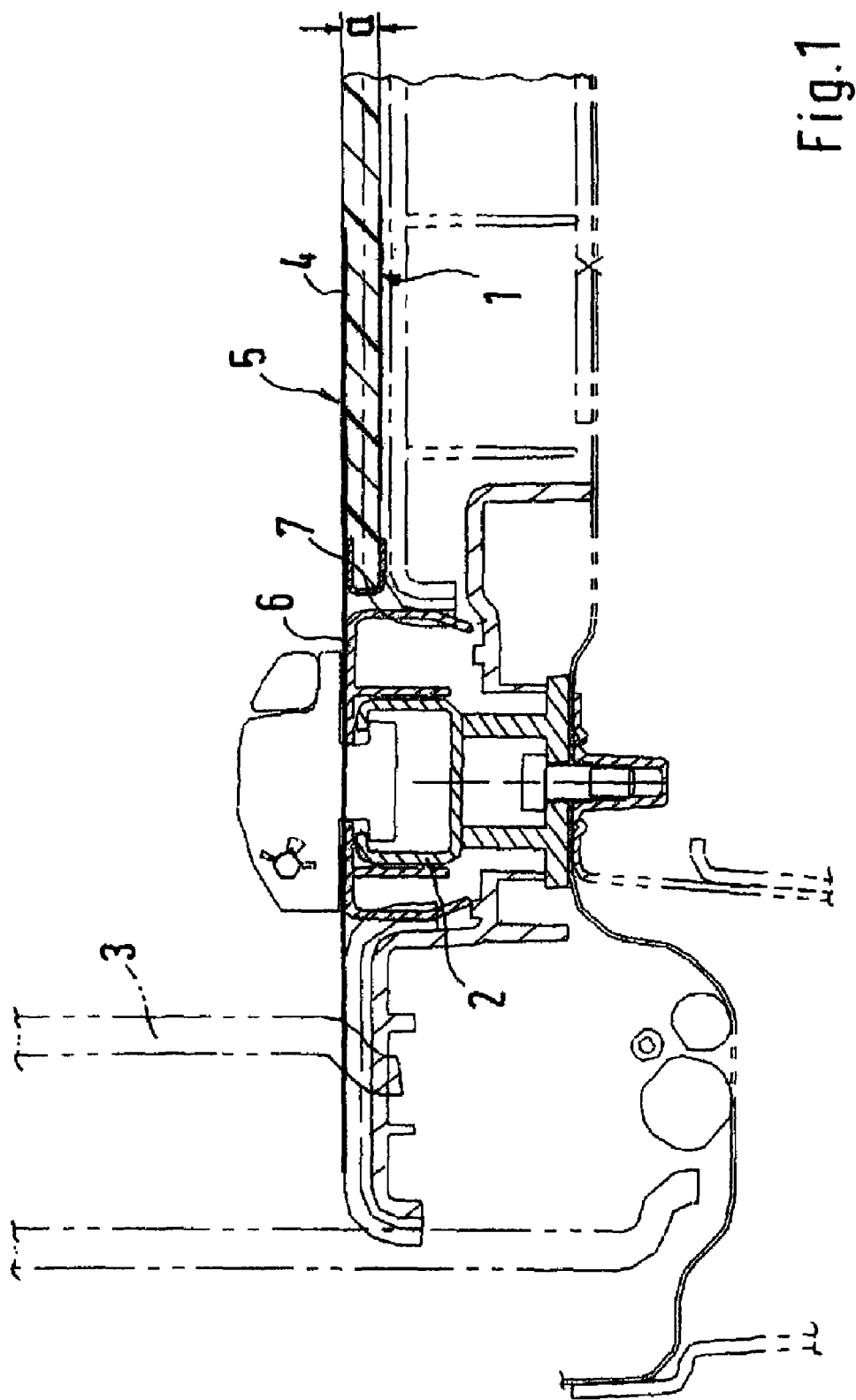
FIG. 1 is a vertical cross-sectional view through a cargo space floor of a motor vehicle having interposed reversible mat.

A cargo space floor 1 of a motor vehicle has a transport securing system, essentially comprising two retaining rails 2, of which only one retaining rail need be shown. The retaining rails 2 extend in the vehicle longitudinal direction L (FIG. 4) and are situated at a distance from one another and in proximity to a side wall 3 and/or a side wall panel in the vehicle structure.

The retaining rails 2 project by a dimension a from the actual cargo space floor. To compensate for this space lying sunken in relation to the retaining rails 2, a reversible mat 4 is inserted into this space. The reversible mat is provided having its external surface 5 at the same level as the outside of a panel 6 covering the retaining rails 2 or, if no panel 6 is provided, the external surface of the retaining rail 2 is implemented at the same level as the external surface 5 of the reversible mat 4.

The reversible mat 4 has a carpet-like appearance on one side and an anti-slip profile on the reverse side. A profiled border 7, which directly adjoins the cover 6 or the retaining rails 2, encloses the reversible mat 4.

Figure 2:
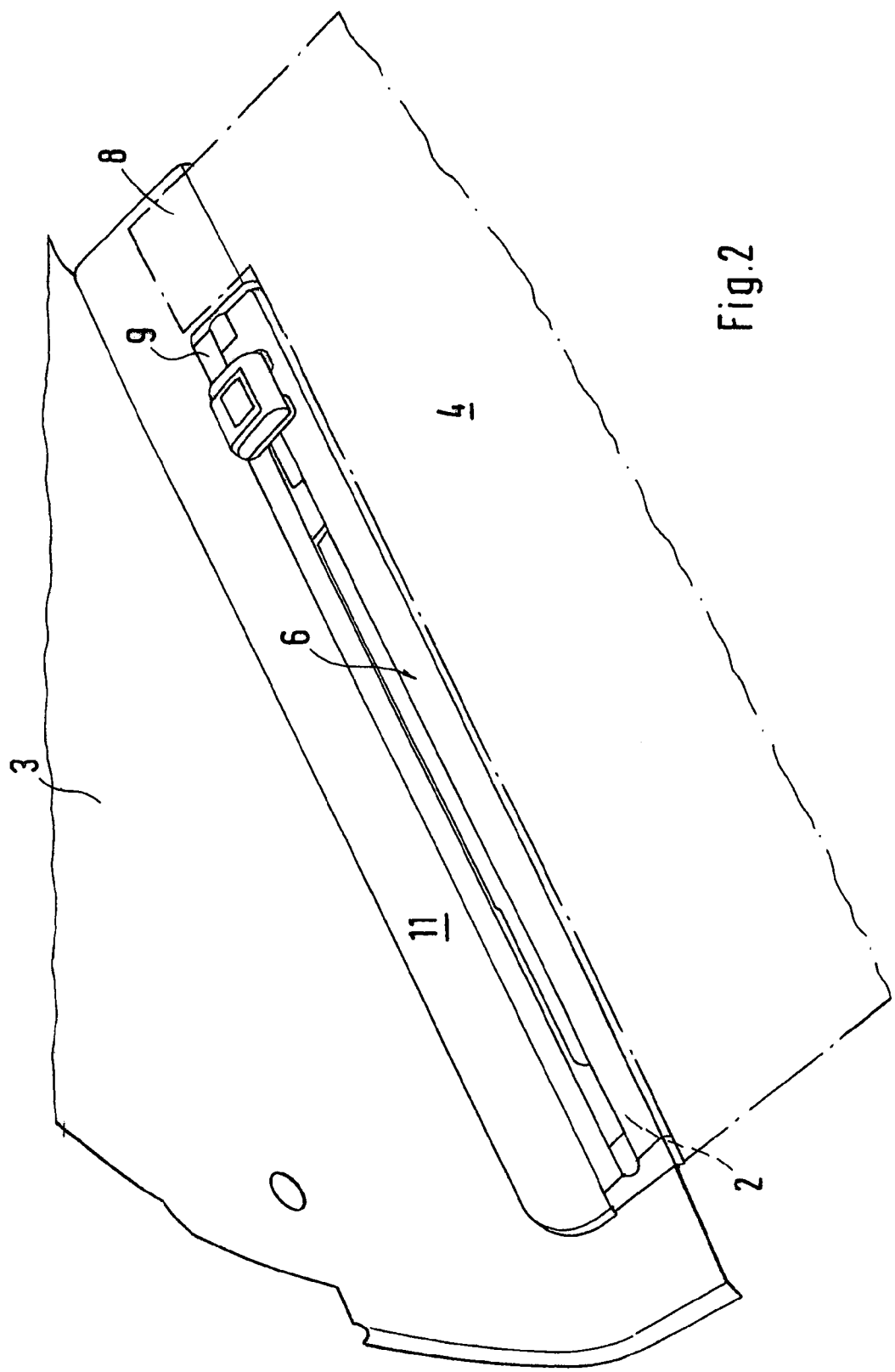
FIG. 2 is a cut-away perspective view of the inserted reversible mat.

The reversible mat 4 preferably extends over the entire length of the cargo space and/or the cargo space floor 1. As shown in greater detail in FIGS. 2 and 3, the front face of the reversible mat 4 has a flap-shaped part 8 at the free end 9 of the retaining rails 2.

According to a further embodiment shown in FIG. 4, the reversible mat 4 may be provided with a slot 10 for the retaining rails 2 and/or for the cover 6 so that the space 11 between the side wall 3 and/or the side wall panel and the retaining rail 2 and/or the cover 6 is also covered by the part 4a of the reversible mat.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A vehicle having a cargo space with a transport securing system comprising at least two retaining rails (2) extending in a vehicle longitudinal direction, arranged adjacent to vehicle side walls, and wherein the at least two retaining rails project a distance from a floor (1) of the cargo space, and a reversible mat (4) situated between the at least two retaining rails on the floor of the cargo space, wherein the reversible mat extends above the floor of the cargo space by the distance that the at least two retaining rails project from the floor and such that a top surface of the reversible mat is at a same level as a top surface of the at least two retaining rails or respective covers of the at least two retaining rails;

wherein the reversible mat has a carpet appearance on a first side and an anti-slip mat with a dirt-repellent surface on an opposite second side;

wherein the reversible mat has an external profiled border (7) directly adjoining the at least two retaining rails (2)

or the respective covers (6) of the at least two retaining rails (2); and wherein the reversible mat has a slotted cutout (10) for each of the at least two retaining rails (2) such that a respective part (4*a*) of the reversible mat (4) extends between the vehicle side walls (3) or inner side panels and a respective one of the at least two retaining rails.

2. The vehicle according to claim 1, wherein the reversible mat extends over an entire length of the cargo space floor, and a front face of the reversible mat is provided with a flap-shaped part extending over a width of the retaining rails.

* * * * *